US011307651B2

(12) United States Patent
Zavesky et al.

(10) Patent No.: US 11,307,651 B2
(45) Date of Patent: Apr. 19, 2022

(54) IMMERSION CONTROL SYSTEM FOR EXTENDED REALITY SYSTEMS

(71) Applicants:AT&T Intellectual Property I, L.P., Atlanta, GA (US); AT&T Mobility II LLC, Atlanta, GA (US)

(72) Inventors: Eric Zavesky, Austin, TX (US); James Pratt, Round Rock, TX (US); John Oetting, Zionsville, PA (US); Jason Decuir, Cedar Park, TX (US); Terrel Lecesne, Round Rock, TX (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 16 days.

(21) Appl. No.: 16/916,221

(22) Filed: Jun. 30, 2020

(65) Prior Publication Data

US 2021/0405736 A1 Dec. 30, 2021

(51) Int. Cl.
*G06F 3/00* (2006.01)
*G06F 3/01* (2006.01)
*H04L 67/306* (2022.01)
*H04L 67/75* (2022.01)
*H04L 67/131* (2022.01)

(52) U.S. Cl.
CPC ............ *G06F 3/011* (2013.01); *H04L 67/306* (2013.01); *H04L 67/36* (2013.01); *H04L 67/38* (2013.01)

(58) Field of Classification Search
None
See application file for complete search history.

(56) References Cited

U.S. PATENT DOCUMENTS

| | | | | |
|---|---|---|---|---|
| 8,732,662 | B1 * | 5/2014 | Savant | G06F 9/4451 717/120 |
| 10,484,811 | B1 * | 11/2019 | Mindlin | H04S 3/008 |
| 2014/0111523 | A1 * | 4/2014 | Scholler | G06F 9/453 345/473 |
| 2015/0100891 | A1 * | 4/2015 | Tobin | G06Q 30/0641 715/745 |
| 2015/0268717 | A1 * | 9/2015 | Schlumberger | G06F 3/048 345/156 |
| 2016/0313790 | A1 * | 10/2016 | Clement | G02B 27/0093 |
| 2016/0350868 | A1 * | 12/2016 | Votaw | G06Q 40/12 |
| 2017/0180435 | A1 * | 6/2017 | Edwards | H04L 65/4076 |
| 2017/0302903 | A1 * | 10/2017 | Ng | G06F 3/013 |
| 2018/0024630 | A1 * | 1/2018 | Goossens | G06F 3/011 345/156 |
| 2018/0060948 | A1 * | 3/2018 | Mattingly | G06Q 30/0639 |
| 2018/0206069 | A1 * | 7/2018 | Santos | G07C 11/00 |
| 2019/0251622 | A1 * | 8/2019 | Wiedmeyer | G06Q 30/0631 |
| 2019/0278591 | A1 * | 9/2019 | Sharma | G06F 8/77 |
| 2019/0278697 | A1 * | 9/2019 | Sharma | G06F 11/323 |
| 2020/0029164 | A1 * | 1/2020 | Swaminathan | H04R 1/406 |

(Continued)

*Primary Examiner* — Martin Mushambo
(74) *Attorney, Agent, or Firm* — Guntin & Gust, PLC; Dana Lemoine

(57) ABSTRACT

Aspects of the subject disclosure may include, for example, assembling an extended reality (XR) immersive experience for a user, determining a user experience level for the user, adjusting an immersion detail level for the XR immersive experience according to the user experience level, and communicating data defining the XR immersive experience to XR equipment of the user. Other embodiments are disclosed.

20 Claims, 9 Drawing Sheets

(56) References Cited

U.S. PATENT DOCUMENTS

| | | | |
|---|---|---|---|
| 2020/0049989 A1* | 2/2020 | Brown | G06F 3/013 |
| 2020/0196086 A1* | 6/2020 | Swaminathan | H04S 7/304 |
| 2020/0280496 A1* | 9/2020 | Getting | H04L 41/509 |
| 2020/0344549 A1* | 10/2020 | Wegener | G06F 3/165 |
| 2020/0398020 A1* | 12/2020 | Bathina | G16H 40/63 |
| 2021/0160644 A1* | 5/2021 | Olivieri | G06F 3/012 |

* cited by examiner

US 11,307,651 B2

IMMERSION CONTROL SYSTEM FOR EXTENDED REALITY SYSTEMS

FIELD OF THE DISCLOSURE

The subject disclosure relates to an immersion control system extended reality (XR) systems.

BACKGROUND

Extended reality (XR) systems create immersive experiences that may be enjoyed by a wide variety of users. The types of immersive experiences that such systems create are more and more created automatically by computer systems.

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments for modifying aspects of an extended reality (XR) immersive experience based on personal preferences, demographics or an existing policy model to improve the enjoyment of the experience by the user. Other embodiments are described in the subject disclosure.

One or more aspects of the subject disclosure include initiating an immersive experience by a user of an extended reality (XR) system, assembling the immersive experience to form an assembled immersive experience and communicating data defining the assembled immersive experience to an XR apparatus of the user. The subject disclosure may further include determining user preferences of the user and modifying one or more aspects of the immersive experience during the assembling the immersive experience according to one or more user preferences of the user.

One or more aspects of the subject disclosure include assembling an extended reality (XR) immersive experience for a user, determining a user experience level for the user and adjusting an immersion detail level for the XR immersive experience according to the user experience level. The subject disclosure may further include communicating data defining the XR immersive experience to XR equipment of the user.

One or more aspects of the subject disclosure include generating, by a processing system including a processor, an immersive experience for a user, providing data defining the immersive experience to extended reality (XR) equipment of the user and evaluating immersion impact by elements of the immersive experience on the user. The subject disclosure may further include determining, based on the immersion impact, that a selected element of the immersive experience includes a policy violation of a policy for the user and modifying the selected element to avoid a policy violation, thereby forming a modified element. The modifying occurs prior to providing data defining the selected element in the immersive experience to the XR equipment of the user. The subject disclosure may further include providing, without interruption, data defining the immersive experience to the XR equipment of the user during the modifying of the selected element to avoid the policy violation, and providing data defining the modified element to the XR equipment of the user.

Figure 1:
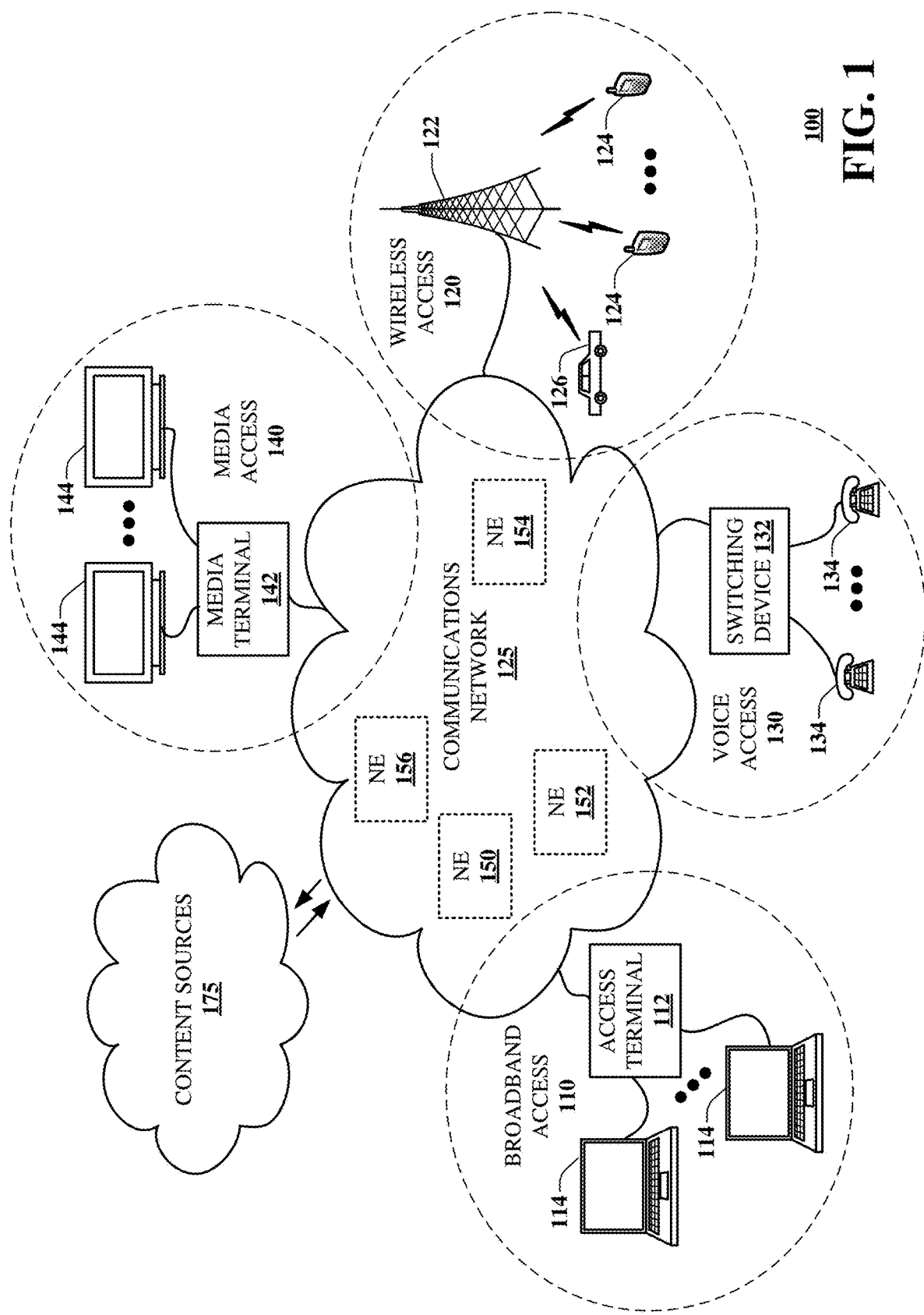
FIG. 1 is a block diagram illustrating an exemplary, non-limiting embodiment of a communications network in accordance with various aspects described herein.

Referring now to FIG. 1, a block diagram is shown illustrating an example, non-limiting embodiment of a communications network 100 in accordance with various aspects described herein. For example, communications network 100 can facilitate in whole or in part modifying aspects of an extended reality (XR) immersive experience based on personal preferences, demographics or an existing policy model to improve the enjoyment of the experience by the user. Communications including data defining the immersive experience may be provided over communications network 100. In particular, a communications network 125 is presented for providing broadband access network 110 to a plurality of data terminals 114 via access terminal 112, wireless access network 120 to a plurality of mobile devices 124 and vehicle 126 via base station or access point 122, voice access network 130 to a plurality of telephony devices 134, via switching device 132 and/or media access network 140 to a plurality of audio/video display devices 144 via media terminal 142. In addition, communication network 125 is coupled to one or more content sources 175 of audio, video, graphics, text and/or other media. While broadband access network 110, wireless access network 120, voice access network 130 and media access network 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access network 110, wireless access network 120, voice access network 130, media access network 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
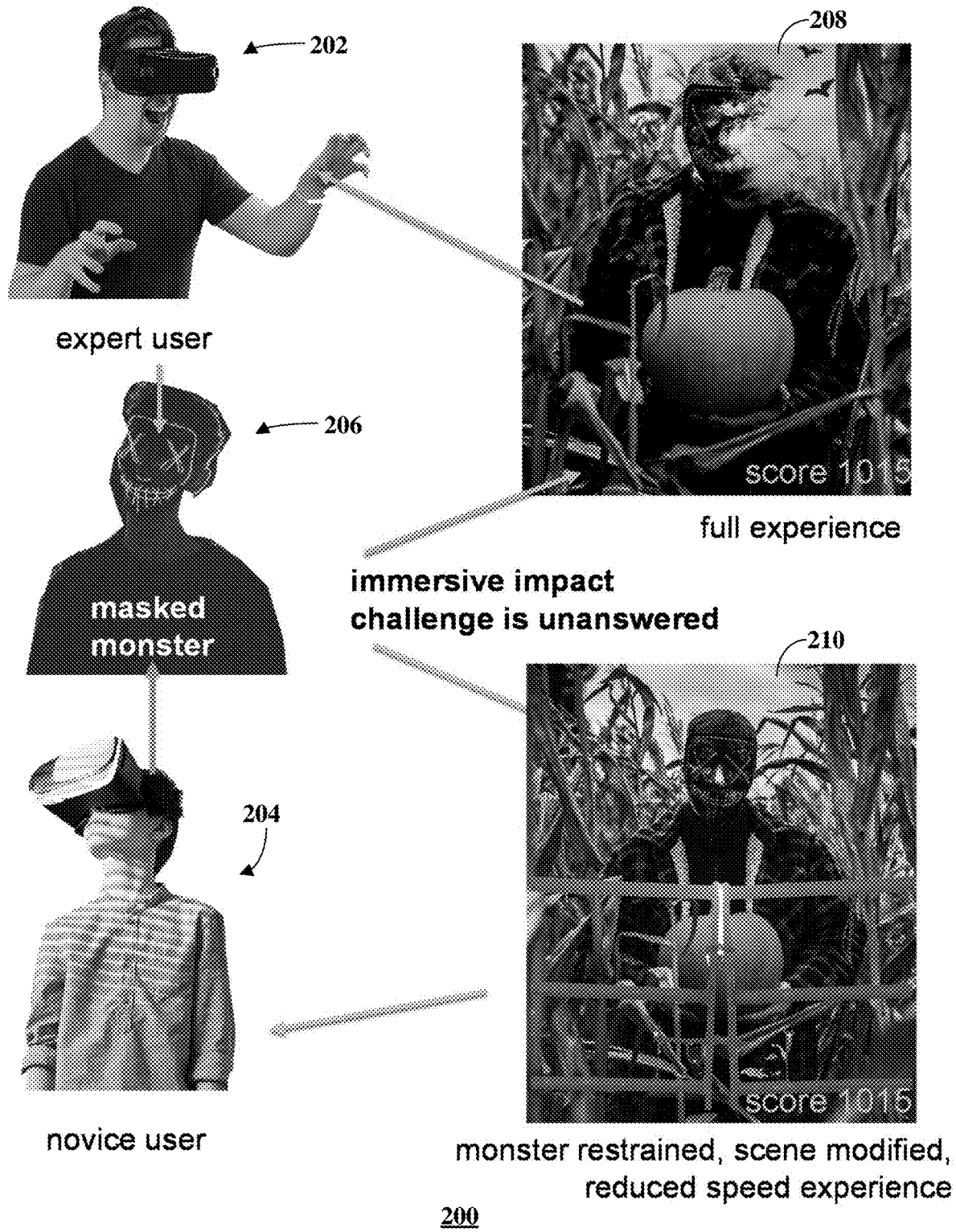
FIG. 2A is a block diagram illustrating an example of a multi-player virtual reality experience.

FIG. 2A is a block diagram illustrating an example of a multi-player virtual reality experience 200. In the illustrated example, a first user 202 and a second user 204 interact with the virtual reality experience 200. Each of the first user 202 and the second user 204 wears equipment such as a headset to allow the user to see the virtual reality experience 200 using immersive technology. In this example, user 202 is an adult and may be considered an expert user based on experience with virtual reality experiences, online gaming and maturity level. In contrast, user 204 is a child and may be considered a novice user based on experience with virtual reality experiences, online gaming and maturity level.

Immersive technology allows creation of an immersive experience for a user such as user 202 and user 204. An immersive experience includes or presents an environment that is, at least in part, illusory and that seems to partially or completely surround the user so that the user feels to be inside the immersive experience and to be a part of the immersive experience. An immersive environment allows the user to experience some things that are physically impossible. An immersive experience may have the effect of augmenting reality or the real world by combining real world features, or supplementing them or replacing them, with artificially created features. Providing specific examples, an immersive experience can vary from a VR game that places the user in a situation where she or he must escape from a farm where a clown has gone mad. Depth of the immersion is enhanced with visuals, audio, and a narrative where one or more virtual characters demonstrate adversarial views. In another example, one or more users may be in an immersive experience while touring certain areas of a national park, like the Grand Canyon. As part of the AR experience, boulders fall during a simulated earthquake to demonstrate the chaos of nature. Examples of non-immersive experiences include a VR game about math that uses simple numbers, sounds, and a flat display to demonstrate addition or an AR system that displays only textual enhancements (e.g. floating graphical signs) to a painting in a museum display. To further differentiate, if either the VR game or the AR system above were modified to include demonstrations from historical figures, direct addressing of the user, or any activity that invokes the philosophical phrase "suspension of disbelief" or "suspension of judgment concerning the implausibility of the narrative," each may be considered an immersive experience.

Immersive technology includes equipment such as virtual reality (VR) headsets, augmented reality (AR) smart glasses, audio speaker systems and computer control to create immersive experiences. For example, augmented reality (AR) systems use technology such as an AR headset and the camera and screen on a smartphone or tablet to add a computer-simulated layer of information on top of real world features. AR technology is an enhancement of the world surrounding the user. Virtual reality (VR) goes a step further and immerses the user in a wholly artificial world, a digital simulation and creation with which the user can interact. A VR system will seek to stimulate as many user senses as possible to immerse the user in the simulated environment, including sight, hearing and touch. Extended reality (XR) refers to environments that combine real and virtual environments and permit human and machine interactions. An XR environment may be generated by computer equipment and be may implemented by wearable technology such as a headset or glasses. XR technology may be considered to incorporate AR, VR and other technologies for immersive experiences. As used herein, an immersive environment, an immersive experience, an XR environment, and a scene generally refer to a combination of real and virtual environments for a user under automatic machine control.

In the future, more and more VR and XR experiences will be computer generated. A computer implementing a gaming system or other VR or XR engine will create immersive experiences for users according to user interests. The computer may automatically generate the XR experience as a free-form experience rather than as a guided experience for the user. The computer-generated experience, in particular, may bring new types of problems or risks or even dangers for users who interact in immersive experiences. For example, as shown in FIG. 2A, there may be multiple users interacting inside a virtual experience. Each person may have an associated avatar. For example, user 202 has an avatar 206 that appears as a monster. The experience, as created by a computer, may create scenarios that are harmful or inappropriate for user 204, the child who is a novice user. In the future as well, there will be technological problems with reliably providing data to XR equipment of the users without any apparent delay or interruption in the data flow, so that the immersive effect remains unbroken for the user.

In the example of FIG. 2A, as noted, the user 202 is a more mature user who is older and knows how to manipulate a VR game, including the avatar 206. The user 202 is provided with the full VR experience. For example, the user 202 may be shown an experience 208 with darker themes, more violence, and more potentially frightening scenarios. For a novice user, such as user 204, the same full experience might be too frightening, upsetting or objectionable. Therefore, it is desirable to mediate the immersive experience so that the novice user, user 204, and the expert user, user 202, can enjoy the same immersive experience and have acceptable experiences, especially in embodiments where the immersive experience is generated automatically by a computer system.

As the number of XR experiences continues to grow, the level of acceptance and immersion intensity for each user may have wide variances. First, in experiencing new objects and experience as common in living or massive open online course (MOOC) systems, the identification and scoring of new XR impact and potential dangers may be required. Second, if the user did discover something objectionable, there is currently no way for the system or the experience to remember or prevent future instances of this negative impact from occurring again. Upon identification of a positive XR impact, the data related to the XR impact should be recorded and used to select similar occurrences in the future. Finally, while systems are still user proximal (e.g. in user control where the user can execute a full exit or turn off the device), the user seldom has the ability to refine the experience for negatively impacting content. No system, from XR hardware or XR engine creators, or extra metadata channel from content providers, currently possesses these critical user-experience analysis tools.

In a conventional system, only a warning may be provided about the content of the immersive experience. There may be a warning about age-appropriateness of the subject matter of the immersive experience or a parental-content warning. The warning may appear on a package label or in streaming content, such as at the beginning of the immersive experience. The warning is generally static and pre-set and prepared ahead of time by a manufacturer or supplier.

In contrast, an apparatus and method in accordance with the subject disclosure can dynamically take into account aspects of respective users of the immersive experience. For example, the apparatus and method can respond to factors such as age, experience level and maturity level of the user. The apparatus and method can further respond to how the user is currently feeling. A user's state of mind can change over time, as the user is playing the game or enjoying the immersive experience. The apparatus and method include features of detecting the user's comfort level or state of mind and providing that to the computer system that generates the experience. That computer system, in turn, dynamically modifies the experience it generates according to the determined comfort level or state of mind of the user.

Some aspects of the apparatus and method in accordance with the subject disclosure are illustrated in FIG. 2A. The user 202 is determined to be an expert user and is given access to the full experience 208 of the immersive environment. User 202 controls avatar 206 with the appearance of a monster in the full experience 208. For the user 202, the experience 208 appears dark and potentially frightening in an entertaining way. The experience 208 may include relatively violent scenes or other adult themes. The user 204, however, is determined to be a novice user or a user with less experience and more delicate sensibilities. The user 204 experiences a very different immersive experience 210 from the experience 208 presented to the user 202. In accordance with aspects of the subject disclosure, the user 204 sees an experience 210 that is lighter and less threatening in appearance. Images are softened in experience 210 relative to experience 208. Movement is restrained and happens at a slower speed in experience 210 for user 204 relative to experience 208 for user 202. In experience 210, violence and adult-oriented themes are softened, reduced or eliminated. The users, user 202 and user 204, enjoy the same environment with similar characters and avatars and activities. However, each respective experience, including experience 208 for user 202 and experience 210 for user 204, is tailored to the respective user. Tailoring may be based on any suitable factors such as experience level, age, emotional maturity or others.

Figure 2B:
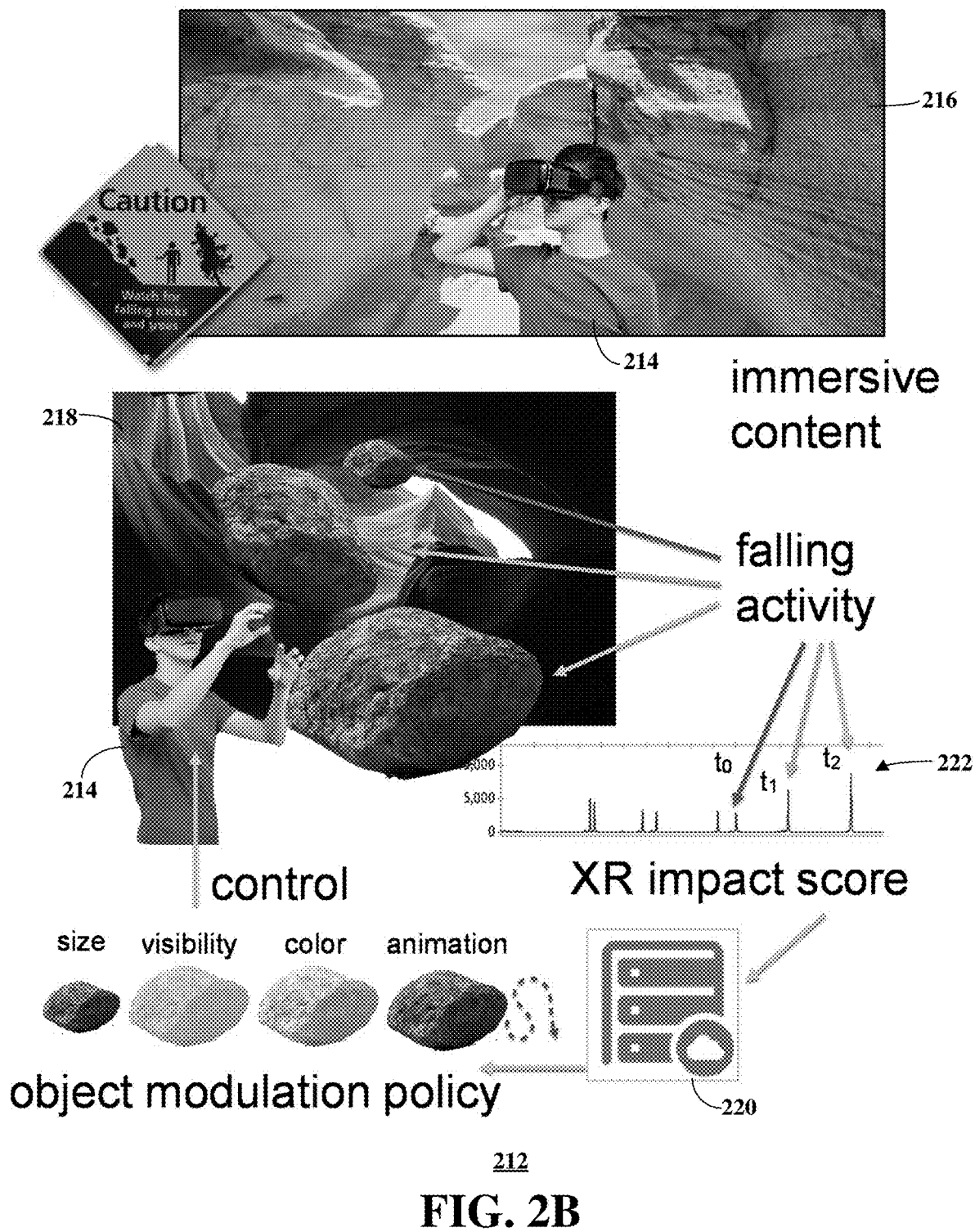
FIG. 2B is a block diagram illustrating an example, non-limiting embodiment of a images created by an extended reality system functioning within the communication network of FIG. 1 in accordance with various aspects described herein.

FIG. 2B is a block diagram illustrating an example, non-limiting embodiment of images created by an extended reality system 212 functioning within the communication network 100 of FIG. 1 in accordance with various aspects described herein. FIG. 2B illustrates a user 214 experiencing different scenes in an immersive environment, including a first scene 216 and a second scene 218. The immersive environment is created under control of an XR engine 220. The XR engine 220 includes in an exemplary embodiment a processing system including a processor and a memory storing instructions and data to control the processing system to implement the XR environment. The XR engine 220 responds to inputs, including inputs from the user 214, to control the activity, including images, sounds and other sensory experiences presented to the user 214, over time.

The system 212 provides an enhanced XR experience relative to a conventional XR experience. In one aspect, the XR engine 220 implements a control system for immersion enabling and filtering. Users of the system 212 engage the system 212 to initiate and experience an immersive environment. The XR engine 220 allows each user including user 214 to have individual control of immersive components of the immersive environment. Such immersive components include XR actors, visuals, audio, time perception, and others. The user 214 may provide inputs or variable values to control such immersive components. Further, the system may set one or more inputs or variable values to control such immersive components. The inputs or variable values may be chosen to enable or disable or filter any selected aspect of the immersive experience and the immersive components. For example, some immersive components may be softened or downgraded in immersive impact, such as by reducing relative levels of violence seen by the users in the environment or volumes of sounds heard by the user in the environment. Such inputs or variable values may be set by parameter and may be either specific or class-based.

In a second aspect, the XR engine 220 of system 212 enables inclusion of various policy models to control the immersive environment. Such policy models may be set by an individual user such as user 214 according to the user's personal preferences. Such policy models may be set by an owner of the system 212 who makes it available for others to use, including owners of XR hardware components and owners of systems for distributing XR experiences. Such policy models may be set based on content, such as a digital rights management policy maintained by a copyright owner or another party. The policy model may be set based on activity portrayed in an XR environment or scene. The policy model may be set based on personal preferences of the user or of a guardian such as a parent. The policy model may be set based on content specifications, based on the particular types of content that is the subject of the immersive experience. The policy model may be set based on the environment or context of the immersive experience portrayed. The policy model may be set based on any other suitable source on basis.

In a third aspect, the XR engine 220 of system 212 enables predicting and prescribing a changing immersion impact for user such as user 214. For example, the system 212 recognizes impact that a scene or immersive component has on a user and that has been assessed externally to the system 212. Based on that awareness, the system 212 predicts a potential further impact of a scene or immersive component such that a control can be enacted by the system. The control maybe based on a policy such as a policy model set by the user or by any other source. In some examples, the control may originate from an external input or understanding of recognized real or virtual items. The control may be based on safety to the user. The control may originate with an external assessment or from an association by the system of safety or immersion intensity for objective evaluation and manipulation. In some examples, information and descriptions may come from external systems such as the provider of content of the XR experience or some other certifying authority.

In the example of FIG. 2B, a user such as user 214 has established an object modulation policy model. Information of the object modulation policy model is stored, for example, at a server computer system which implements the XR engine 220. The object modulation policy model is used by the XR engine 220 during presentation of the immersive experience to the user 214.

In some examples, the XR engine may have a set of default parameter values for defining the immersive experience. For example, these default parameter values may correspond to the full experience shown to the user 202 of the virtual reality experience 200 of FIG. 2A. When the user 214 or another party or machine establishes or modifies a parameter value of a policy model, the new parameter value is used in place of the default value. Along with the default values, some or all parameters may have a range of allowed values. An attempt to modify a parameter value to a value outside the range of allowed values will be ineffective and may generate an error message or other notification.

The object modulation policy model in the example of FIG. 2B includes a number of parameters that define aspects of the immersive experience seen by the user 214. Exemplary parameters for a rock or boulder that might be seen falling on the user 214 in the immersion include the size of the rock, the visibility of the rock, the color of the rock and animation features of the rock. Animation features may include parameters defining factors such as its behavior when falling or appearing to fall, the speed of motion of the rock, the physics of the rock including its response to gravity, its deformability, its apparent weight, and others as well. FIG. 2B illustrates a time scale 222 in which events in the immersive experience are generated by the XR engine 220 according to one or more policy models or parameters.

These parameters and others form one or more policy models that will define the experience for the user 214. These parameters may be set by the user, by the owner of equipment presenting the immersive experience, by a parent or guardian of the user 214, by the owner of the content which forms the immersive experience, by a service provider which provides access to the immersive experience, or any combination of these. The XR engine 220 refers to each respective policy model during presentation of the immersive experience and adjusts the immersive experience accordingly. The respective policy models may have assigned relative priorities for determining which policy model controls the immersion in the event of a conflict among the policy models. Any suitable conflict resolution method may be used.

In some examples, the user 214 can give feedback to the system 212 to set or modify a policy model or a parameter of a policy model. The user 214 may provide the feedback during the immersion or subsequently. For example, if the user 214 does not like the color of an object or other immersion component, the user 214 may interrupt the immersion and modify the parameter that controls that feature of that immersion component. In another example, the user may find that the object moves too rapidly in the immersion, particularly for the user's relative skill level. The user 214 may interrupt the immersion, adjust playback speed to a more comfortable level, and resume the immersion. Adjustments to some features, like playback speed, may be useful for training in some immersions. These additional adjustments may be made by the user without interruption of the immersion through gestures, voice commands, or additional controls (buttons, switches, etc.) that are native to the XR system 212. Thus, the XR engine 220 may provide any suitable user interface for the user 214 to adjust parameters and other features of a policy model.

The XR engine 220 can use the policy models to predict and prescribe how the immersion is impacted by the policy models. An immersion is any XR experience in which a user is brought to a different type of experience than the user is currently in, or the user's current experience is augmented in some way. Some aspect of an immersion are real and some aspects are virtual. In an immersion, the user feels the experience is all cohesive and is not focusing on whether objects are real or virtual. In an immersion in an XR experience, the user has a sense of intimacy when interacting with objects and things and people that mimics real life.

The policy models can be used to control the experience or intimacy. For example, a virtual animal in an immersion can interact with the user very closely, such as through intense eye contact, eyes that follow the user's eyes, bodily motions such as tail wagging and others that closely mimic a real animal or even an animal imbued with human personality. This creates a connection with the user. That degree of intimacy may make the user uncomfortable and thus may be controlled by one or more parameter values that are part of the user's preferences or policy model.

Policy models may be applied to content that is provided by a content owner to an immersive experience. For example, characters may be licensed for use in an immersive experience, such as characters developed and owned by The Walt Disney Company. Licensing arrangements may include details about the permitted appearance of the licensed characters including attire or activities in the licensed characters participate. The owner of the licensed property may establish parameter values that control the appearance, sound or other aspects of the licensed character when the licensed character is presented in an immersive experience. The XR engine 220 consults the parameter values in the owner's policy model to determine how the licensed character may appear or be used in an immersion. Similar parameters may be set and used for any licensed property including videos, audio including music, logos and brand names and others.

Content owner policy models may be applied to control or limit the response of a user such as user 226 to the immersion. For example, if the immersion includes a virtual experience of an amusement park ride which is provided as content by an owner of the amusement park ride, the owner of the content may specify that the immersive experience of the ride may not cause nausea among users. That requirement may affect a number of parameters that control the immersion, such as apparent speed of the ride, elevation gains or drops, etc. The system 212 may use sensors such as haptic sensors to detect the condition or response of the user 214 and adjust the immersion, using one or more parameters, accordingly. In another example using the falling rock example of FIG. 2B, the owner of the content may specify that no user such as user 214 may be virtually crushed by a falling object such as a rock. The XR engine 220 may, for example, adapt the physics of the falling virtual rock to prevent a collision with the user 214.

Figure 2C:
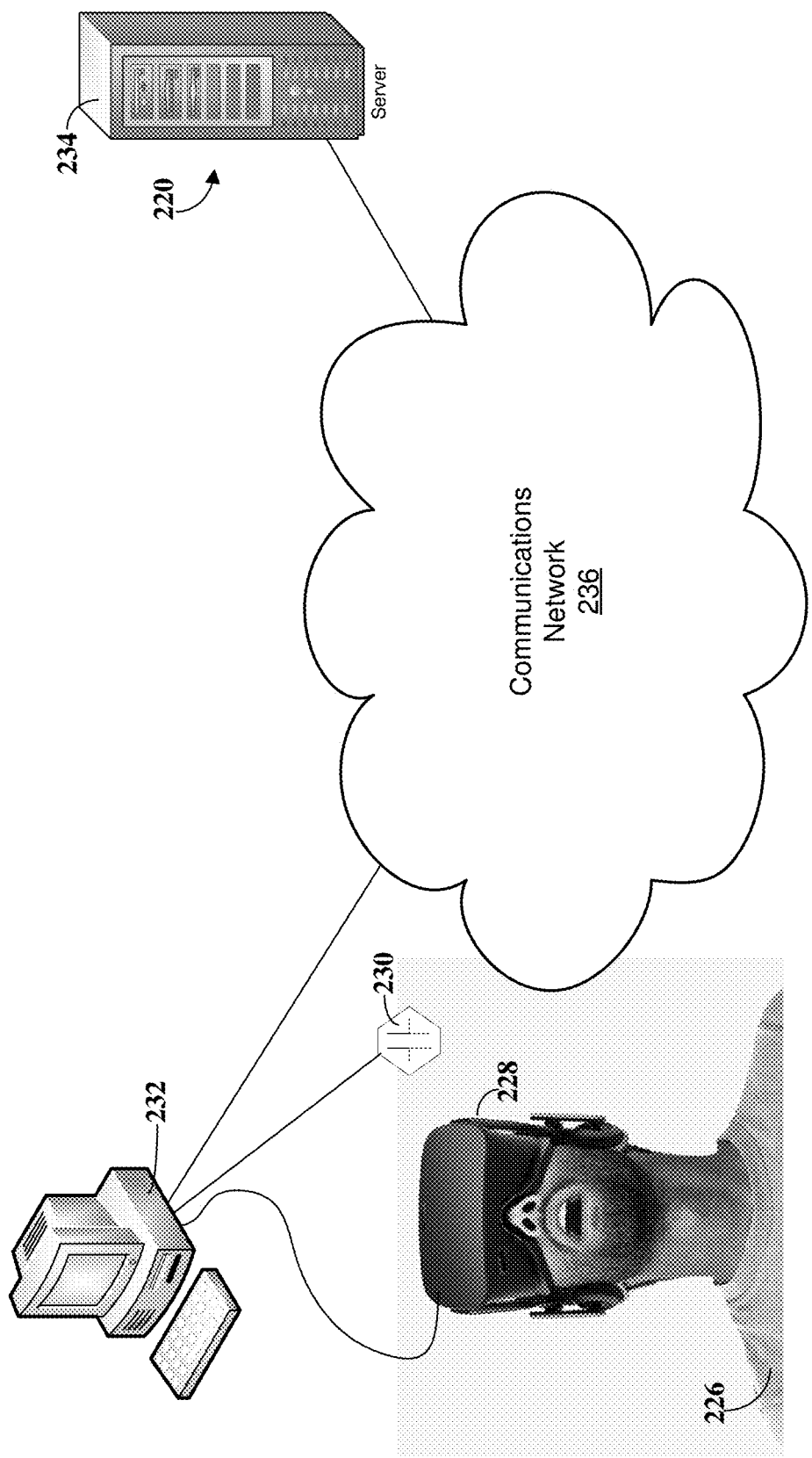
FIG. 2C is a block diagram illustrating an example, non-limiting embodiment of a system functioning within the communication network of FIG. 1 in accordance with various aspects described herein.

FIG. 2C is a block diagram illustrating an example, non-limiting embodiment of an immersive system 224 functioning within the communication network of FIG. 1 in accordance with various aspects described herein. FIG. 2C illustrates a user 226 enjoying an immersive experience presented by immersive system 224. The user 226 wears immersive equipment including an extended reality (XR) headset 228 that cooperates with extended reality engine 220 to present the immersive experience to the user 226.

The system 224 in this embodiment enables a user 227 to interact with an extended reality (XR) environment. The system 224 in this embodiment includes an XR headset 228 wearable by the user 226, one or more sensors 230, a user computer 232, and an XR server 234 accessible over a communications network 236.

The XR headset 228 enables the user 226 to experience, generally, an XR environment, where XR is a general term intended to encompass XR, VR and augmented reality (AR) systems, equipment and environments. The XR headset 228 generally includes a data processing system including one or more processors, a memory for storing data and instructions, and a communication interface. The XR headset 228 provides a visual display to the user 226 and may include one or more display screens within the XR headset 228 to control the view seen by the user 226 and the environment experienced by the user 226. Further, the XR headset 228 may include a camera for capturing images of the environment of the user 226. The XR headset 228 may include speakers to provide sound information to the user 226 and the XR headset 228 may include one or more microphones to collect sound information about the environment of the user 226. In other embodiments, the XR headset 228 may be embodied as AR glasses or other wearable devices, or may be operated in conjunction with a fixed display system such as a computer monitor, television or series of display screens in the physical environment with the user 226.

The sensors 230 may include any sort of condition sensing and data collection apparatus suitable for the embodiment of the system 224. The sensors 230 may include one or more cameras that collect images of the physical environment near the user 226. The cameras may collect visual images, infra-red images and others. The sensors 230 may include environmental sensors that collect information such as temperature, wind speed, orientation or acceleration, or other physical factors of the environment where the user 226 is located. If the user 226 is operating a vehicle, the sensors 230 may detect vehicle speed and steering, acceleration and braking inputs by the user 226. If the vehicle is a driver assisted vehicle, the sensors 230 may collect all information available to the driver assistance system such as images from cameras, navigation and location data, data from Lidar sensors, and others. The sensors 230 may further gather information about the user 226. Such information may include biometric information, such as pulse rate or respiratory rate, skin conductivity, pupil dilation, haptic information about one or more touches of the user 226, and so forth. Thus, the sensors 230 may include or be part of a wearable device such as a watch, belt or harness. Further, such user data may include information about the position, posture and movement of the user. Any sort of data that may be useful by the system 224 for monitoring the user 226 and controlling the XR environment may be sensed by the sensors 230. In some embodiments, the sensors 230 merely sense a condition and report information. In other embodiments, one or more of the sensors 230 may be controllable, such as by the user computer 232.

The user computer 232 is in data communication with the XR headset 228 and the sensors 230. In the illustrated embodiment, the user computer 232 has wireline connections to the XR headset 228 and the sensors 230. In other embodiments, the wireline connections may be supplemented or replaced with one or more wireless connections, such as a WiFi connection according to the IEEE 802.11 family of standards or a Bluetooth connection according to the Bluetooth standard.

The user computer 232 cooperates with the XR headset 228 to provide the XR environment for the user 226. The user computer 232 communicates with the VR headset 228 to provide video information, audio information and other control information to the XR headset 228. The user computer 232 communicates with the sensors 230 to collect information about the physical environment and the user 226. The user computer 232 communicates with the XR server 234 to provide video and other information from the XR headset 228 to the XR server 234 and to provide information and data from the sensors 230 to the XR server 234. The video and data may be sent in any suitable format, including encoding to reduce the amount of data transmitted or encrypted to maintain security of the data. The user computer 232 communicates to the XR headset 228 virtual reality information to the XR headset 228. In some embodiments, the functionality provided by the user computer 232 may be combined with the XR headset 228. In the embodiment of FIG. 2C, the user computer 232 is shown as a desktop computer. However, any suitable processing system, including one or more processors, memory and a communications interface, may implement the functions of the user computer 232.

The XR server 234 controls provision of the XR environment including immersive experiences to the XR headset 228 for the user 226. The XR server 234 generally includes a processing system including one or more processors, a memory for storing data and instructions and a communications interface. The XR server 234 may be implemented as a single server computer, as multiple server computers at one or multiple locations or in any suitable manner. In the system 224, the XR server 234 implements an extended reality (XR) engine 220.

The XR server 234 receives over the communications network 236 information about the environment of the user 226, including location information, information about objects in the environment and events occurring in the environment. The XR server 234 in some embodiments may further receive information about the user 226, including biometric information and information about the performance of the user 226. The information may come from the sensors 230, the XR headset 228, or any other source. Under control of the XR engine 220, the XR server 234 provides control information over the communications network 236 including video information, sound information, haptic information and any other information, including instructions and data, to the other components of the system 224 including the user computer 232 and the XR headset 228.

The XR engine 220 develops the XR environment as a combination of the actual environment in which the user 226 is located and a simulated or virtual environment. The XR engine 220 retrieves data and other information defining an immersive experience. The information defining the immersive experience may be stored at a memory of the XR server 234 or at another location accessible by the XR server 234. In other examples, the information defining the immersive experience may be received from another location or source as streaming data. The XR engine 220 develops the immersive experience for the user 226 based on the received information defining the immersive experience.

Moreover, the XR engine 220 receives policy information defining one or more policy models for controlling the XR experience generated by the XR engine 220. The policy information may be any sort of data or other information related to the XR experience. The policy information, for example, may include a set of parameter values to be used by the XR engine 220 to define and control the immersive experience. The policy information may include policy information established by the user 226 and policy information established by others. For example, an owner of content received by the XR engine 220 to generate the immersive experience may establish limitations or requirements on the use and reuse of the content. The limitations and requirements may form policy information for use by the XR engine 220. The policy information may initially be established as one or more default values that are modified or overwritten by the user 226 or another. Further, the policy information may be set as an acceptable or unacceptable range of values such as parameter values.

Also, the policy information may be modified or updated after initial receipt and use by the XR engine 220. For example, the user 226 may choose to modify the policy information after viewing a portion of an immersive experience prepared by the XR engine 220. The user 226 may engage a user interface for this purpose. The user interface may be presented by the user computer 232 or by the XR headset 228. The user 226 may modify the policy information in any suitable manner.

Based on the received policy information, the XR server 234 may generate and modify the XR environment of the user 226. The XR engine 220 creates the XR environment. As the XR engine 220 creates the immersive experience, the XR engine retrieves policy information established by the user and others. Based on the policy information, the XR engine 220 modifies the XR environment and presents the modified immersive experience to the user 226.

The system 224 may be supplemented with other equipment as desired or required for a particular purpose. For example, the system 224 may be supplemented with other wearable devices to provide additional feedback, such as haptic feedback to the user 226, to enhance the immersive experience of the user 226. Further, the sensors 230 may provide feedback about the experience of the user 226 in the immersion. In an example, the sensors 230 may detect the heart rate or blood pressure or other biometric information of the user 226. Based on this information, the XR engine 220 may gauge the feelings or satisfaction of the user 226. For example, if the biometric information of the user 226 indicates anxiety on the part of the user 226, the XR engine 220 may treat the biometric information as policy information and adjust the immersive experience accordingly. This serves as a type of automatic, real time feedback, allowing the XR engine 220 to monitor the state of the user 226 and adjust the immersion according to the state of the user 226. If the XR engine 220 determines the user is frightened, the XR engine 220 may make the immersion less frightening. If the XR engine 220 determines the user is bored, the XR engine 220 may make the immersion more exciting in some fashion. Still further, positive XR impacts should be noted by the XR engine and relevant data recorded. For example, if the user is soothed or stimulated or otherwise responds favorably, this may be detected by sensors, for example. The XR engine may note the positive XR impact and store appropriate data about the positive impact. This positive data may be used in the future to select similar occurrences or enhancements to an immersive experience for this user 226 or for other users. The effect on of the change in the immersion may then be monitored by the XR engine.

The communications network 236 may include any combination of wireline and wireless communication networks, including but not limited to broadband access network 110, wireless access network 120, voice access network 130 and media access network 140 (FIG. 1). The communications network 236 may include the internet and may provide access to other devices and services as well.

Figure 2D:
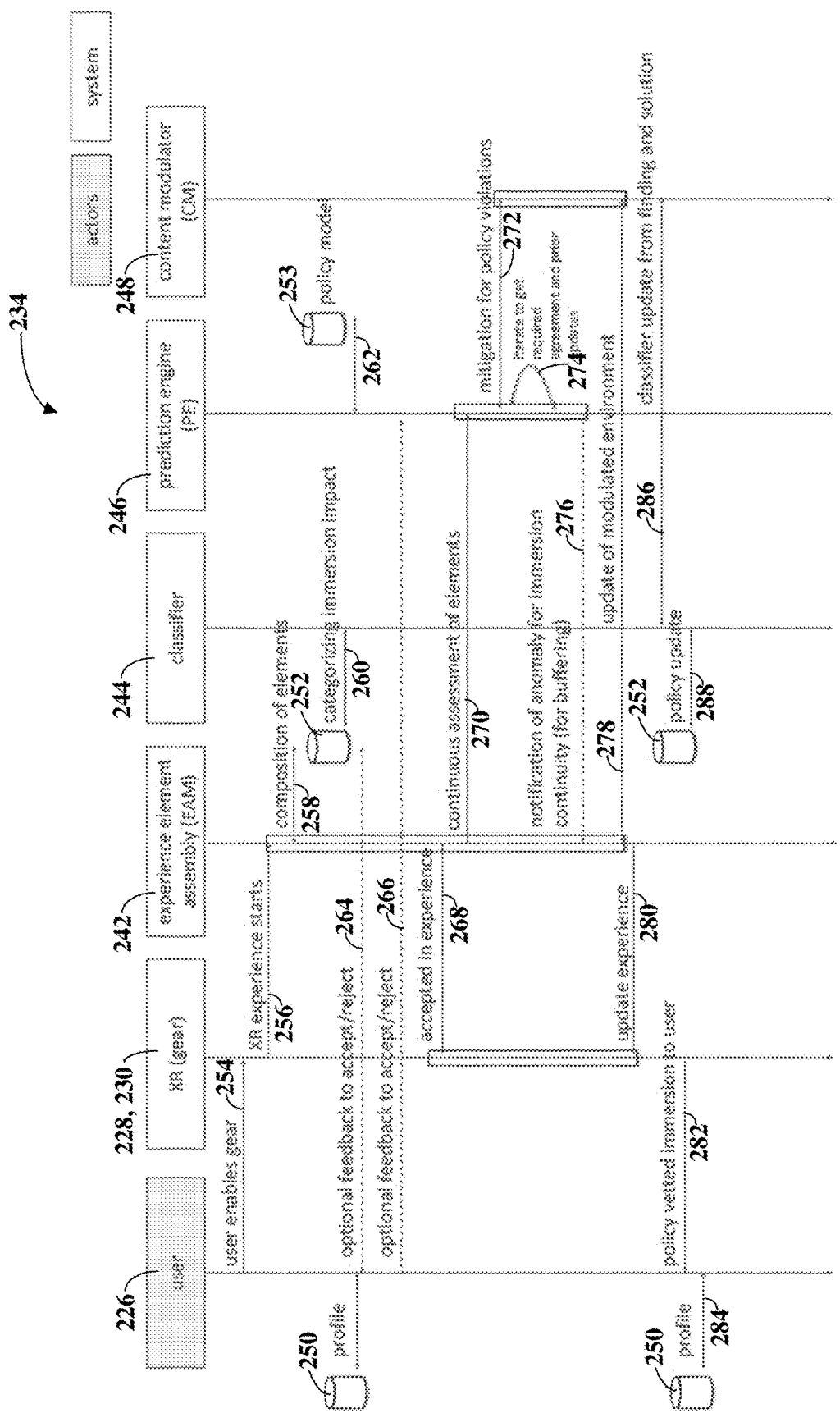
FIG. 2D depicts an illustrative embodiment of a method in accordance with various aspects described herein.

FIG. 2D depicts an illustrative embodiment of a method 240 in accordance with various aspects described herein. The method 240 in general creates and controls an extended reality (XR) environment or immersive experience for the user 226. The user 226 experiences an immersive scene which includes some portions of the physical environment where the user 226 is located, along with some virtual objects or elements that are created, selected, modified and controlled by the XR engine 220 operating on the XR server 234. The combination of the physical objects and the virtual objects by the XR engine 220 creates the immersive scene, immersive experience or immersion.

The method 240 may be implemented by any suitable combination of components. In one embodiment, the method 240 may be implemented by components of system 224 in FIG. 2C, including XR headset 228 and sensors 230 in the environment of user 226 and XR server 234. In FIG. 2D, the user 226 interacts with XR gear or equipment. This represents the rendering endpoint for XR experiences or immersions. In the example, this XR gear includes the XR headset 228 and sensors 230 but could include any other combination of devices for collecting information about the user and the user's environment and providing an immersive experience to the user 226.

Further, the exemplary embodiment of FIG. 2D includes a server computer such as the XR server 234 (FIG. 2C) which responds to data and instructions and implements an XR engine 220 including a number of functional stages or modules. These include in the embodiment of FIG. 2D an experience element assembly (EAM) module 242, a classifier module 244, a prediction engine 246 and a content modulator module 248. The modules implemented by XR server in the XR engine 220 are exemplary only and may be substituted or replaced by any suitable modules or combination of functional elements necessary to perform the required operations.

Further in the exemplary embodiment of FIG. 2D, the steps of method 240 involve storage and retrieval of data by the processing elements. The embodiment of FIG. 2D includes a user profile database 250, an experience database 252 and a policy model database 253. Accordingly, a user profile is maintained in the user profile database 250. The user profile stores user preference information for the user

226 in the user profile database 250. The experience database 252 stores data defining one or more immersive experiences. The EAM module 242 accesses the experience database 252 to locate objects to use when compositing the experience. Moreover, the EAM module obtains data for modifying the objects or aspects of the experience according to user preferences or one or more policy models. The policy model database 253 stores one or more policy models that may be used by the XR engine 220 for developing an immersive experience for the user 226.

Any of the data processing elements or functional elements of FIG. 2D could be located on the XR gear with the user 226, such as the XR headset 228. However, in some embodiments, the EAM module 242, the classifier module 244, the prediction engine 246 and the content modulator module 248 are located remotely from the user and communicate with the user 226 and the XR headset 228 using one or more communications networks such as communication network 236 shown in FIG. 2C.

The EAM 242 operates to assemble or composite different parts of the immersive experience, including applying physics to movement and interactions of virtual elements of the immersive experience with real, physical elements. The EAM module 242 focuses on immersion impact scoring, not on content component objects themselves. Further, the EAM 242 provides the data defining the XR experience to the XR gear of the user 226, including the XR headset. The classifier 244 operates to determine a classification for an object and its immersion impact. The prediction engine 246 determines, based on a policy model and current participants, objects and actions in the immersive experience, what happens next in the immersive experience. The content modulator module 248 operates to take into account the outputs of the classifier and the determination of what happen next to adjust the content of the immersive experience.

The method 240 begins at step 256 when the user 226 enables the XR gear, such as XR headset 228. The XR headset 228 communicates over communications network 236 with the XR server 234. For example, the user 226 may select an immersive experience to enjoy or a game to play. Data processing equipment of the XR headset 228 accesses the XR server 234 to obtain data defining the immersive experience. The XR headset 228 may access the user profile database 250 to locate information of the user 226 such as account information and user preferences. User preferences may include individual impact preferences for policies with feedback between the user 226 and the EAM module 242. The user preferences may further include individual impact preferences between the prediction engine, i.e., for future actions and historical propensity, and also for interactive approval by the user. The XR headset may access one or more sensors 230 to locate information about the environment of the user 226, such as a location, weather, and presence of other objects in the environment.

At step 256, the immersive experience starts. The EAM module 242 begins assembling or compositing the immersive experience and communicating data defining the experience to the XR headset 228. For example, the EAM module 242 may rely on a preexisting script or data flow for the experience, defining the objects, actions and characters in the experience over time. The EAM module 242 assembles data elements defining the immersive experience and communicates a stream of data to the XR gear. At step 258, the EAM module 242 retrieves data from the experience database 252 for compositing the experience. The retrieved data define objects and activities in the experience as the experience plays out over time. Compositing the immersive experience is an aspect of assembling the XR experience including selecting physical elements from the environment of the user 226, selecting virtual objects and characters to populate the XR environment and preparing visual, sonic, and haptic and other aspects of the immersive experience. The data forming the components of the XR environment or the XR experience are prepared in a format for transmission to the XR gear of the user 226. The data format may be standard or may be custom. As the EAM module 242 continues to push data to the XR gear, the EAM module 242 continues to evaluate objects and actions with the prediction engine 246 for impact analysis.

At step 260, the classifier module 244 categorizes the immersion impact. The classifier 244 operates to make a scene-level determination that some action needs to be taken to adjust the immersion experience for the user. For example, if the emotional intensity level of the scene is getting to high, to the point that the intensity level approaches or exceeds a threshold set by the user 226, the classifier 244 determines that the immersion impact is too high for the current user or one or more current policy models. In some embodiments, the classifier 244 may categorize activities or objects or scenes in one or more categories of stress level or anxiety level and store suitable information in the database 252, step 260. The category determined may be used to determine if action should be taken.

At step 262, as the EAM module 242 is compositing the experience, the prediction engine 246 continuously monitors elements within the experience. For example, the prediction engine 246 compares aspects of objects selected or actions taken by the EAM module 242 and compares the aspects with one or more policy models stored in the policy model database 253. The prediction engine 246 determines if an aspect of an object or action represents a violation of a policy model or requires an adjustment, modification or deletion under a policy model of the policy model database 253. In one embodiment, the prediction engine 246 comprises a model whose inputs are simply objects defined using a standard ontology that codify relationships (is-a, has-a, contains-a) and properties (color, shape, size, frequency, etc.). For example, in the English language, computational ontologies have been defined like WordNet, ImageNet, and Knowledge Graph using human- and automated-input collection routines. In this embodiment, the relationships of objects from classification 244 can be learned from explicit interactions and feedback from users in the EAM 242. In another embodiment, these interactions are derived from historical data in the experience model 252 and the policy model 253, which may be collected from one user or aggregated across many users of the system 234. Alternatively, additional resources like SentiWordNet or SentiBank may be utilized to computationally express positive and negative responses between objects. In another embodiment, the prediction engine 246 may be constructed from user-specific inputs such a social media communications (e.g. textual messages, SMS messages, like indicators, rating systems) and user generated content (e.g. photos of the user with other people, objects, etc.) to establish positive or negative affinity towards other objects. In all of these embodiments, a machine learning model is created from a set of training examples to produce a model for evaluation in the prediction engine 246 when new, unseen—and unlabeled—examples are presented to the system.

At optional step 264, if a violation of a policy model has been detected, the EAM module 242 provides a notification to the user 226. The user 226 may accept the violation of the policy model or reject the violation. Similarly, at optional step 266, if a violation of a policy model is detected by the prediction engine 246, the prediction engine 246 delivers a notification to the user 226. The user 226 may accept or reject the violation of the policy model. In either step 264 or step 266, if the user accepts the violation of the policy model, the method continues and at step 268, the violation is accepted in the experience. If the user rejects the violation, the EAM module 242 modifies the immersive experience to account for the policy model.

Beginning at step 270, the XR engine 220 enters a condition in which modulation of the immersive experience is required due to a policy violation. At step 270, the prediction engine 246 continues assessing elements of the immersion as the experience is played out over time by the EAM module 242. The prediction engine 246 detects a violation of one or more policy models when a content object or some other aspect of the experience is determined to be in violation of one or more specified policies. Responsive to detecting the violation, the prediction engine at step 272 requests mitigation of the policy violation with the content modulator module 248.

At step 274, the prediction engine 246 and the content modulator module 248 iterate together to re-evaluate the impact of the modulated object or activity. The iterative process in some embodiments is fully automated. For example the content modulator module 248 generates a modified or new scenario and tests the generated scenario by passing information about the generated scenario to the prediction engine 246. The prediction engine 246 evaluates the generated scenario and provides a score or other indication of whether the generated scenario violates one or more policy models. Based on the score or other evaluation result, the content modulator module 248 modifies the generated scenario. In this manner, the XR engine 220 acting through the prediction engine 246 and the content modulator can generate millions of new scenarios and evaluate those scenarios against a large populace of policies in a short amount of time.

At step 276, the prediction engine 246 optionally sends a notification to the EAM module 242. The notification advises the EAM module 242 of the violation of the policy, also referred to as an anomaly. The notification in some examples indicates to the EAM 242 what object or what action has caused the anomaly so that the EAM 242 can suspend modifying the object or the action as called for by the policy model yet at the same time can continue playing the experience for the user 226. Without the notification provided at step 276, the EAM module 242 in some embodiments would continue compositing the experience despite the policy violation, which might represent an error condition. Also, without the notification, if resolution of the policy violation at steps 272 and step 274 took more than a few fractions of a second, the EAM module 242 might interrupt operation until resolution is reached. Such an interruption might degrade the immersive experience for the user 226. For example, if the EAM module 242 entered a wait state before continuing compositing the immersion, the user 226 might experience a delay in playback or playback jitter, as the EAM 242 plays and pauses and plays and pauses, waiting for resolution of the policy violation.

Instead, responsive to receiving the notification of the anomaly, the EAM module 242 can continue compositing the experience for the user 226 but can take steps to avoid processing the policy violation. For example, the EAM module 242 can cause the action of the experience to appear to slow down, or the EAM module 242 can avoid use of the object that is the subject of the policy violation, or avoid presenting the action that is the subject of the policy violation. In this manner, the XR engine 220 operates to maintain a smooth-flowing immersive experience for the user 226 while the policy violation is resolved. Since policy violation resolution may, in some examples, take an amount of time that might be detectable by the user, the EAM module 242 receives the notification from the prediction engine 246 and responds by avoiding compositing the experience in a way that would violate the policy, yet without causing a delay or interruption in presentation of the experience that would be detectable to the user 226. This solves a substantial technological problem in that the EAM module 242 must continue processing data, compositing the experience and providing data defining the experience to the XR gear, substantially in real time. However, identifying a policy violation, and resolving the policy violation, may take a substantial amount of time. This may be especially true when the prediction engine 246 is evaluating a number of policy models, including a policy model of the user 226, a policy model of the owner of the XR headset 228 or other XR gear, a policy model of the communications network. A policy model of the service provider that provides access to gaming or other immersive experiences, and a policy model of the owner of content on which the experience is based. The process of providing a notification to the EAM module 242 about the anomaly allows the EAM module 242 to resolve the asynchronous nature of resolution of the violation and playback of the experience for the user.

At step 278, the content modulator determines how to update the environment to avoid the policy violation. Once the policy violation has been resolved, the content modulator provides to the EAM module 242 data defining an update of the modulated environment. At step 280, the EAM module 242 updates the experience that the user 226 sees through the XR headset 228 or other XR gear, step 282. In some examples, the user's profile in the user profile database 250 is updated with the information, step 284. Further, at step 286, the content modulator module 248 updates the classifier 244 with information about the policy violation as well as the solution that was obtained by the content modulator. For example, the classifier 244 can be updated with additional samples of what the content modulator module 248 and the prediction engine 246 determined to be valid at step 284. Moreover, general policies can be updated for new, accepted violation thresholds.

Accordingly, in some embodiments, the illustrated system and method provide constant feedback and updating of the user profile in the user profile database 250, in the database 252 and in the policy model database 253. The user profile is updated and the policy model is updated. The feedback enables the illustrated system and method to be a learning system, based on the constant feedback as to what is acceptable or unacceptable in the policy profile and in the immersive experience.

The system and method according to the captioned disclosure provide substantial benefits for future immersion systems. For example, the disclosed system and method provide an increased variety of experience models. Content sources may expand to include fictional characters from books or movies or television programs, theme park characters, etc. As the number of content sources expands, the richness or possible dangers or discomforts for some audience members may increase, as well. For example, a content source such as a Harry Potter character or scenario may develop frightening aspects, or aspects that inappropriate for the original Harry Potter audience. The method of FIG. 2D including the operation of the classifier 244 forms a user-focused scoring system that can provide a score that reflects the appropriateness for the particular user 2226. Previously, it was known for a manufacturer to give a rating to a game or other experience, but the ratings were relatively coarse and not focused on an individual's preferences and personality. Because the illustrated system learns from the operation of the system over time, based on the reaction and response of the specific user, the disclosed system and method may give a score which is better focused for the particular user's needs.

A further benefit is provided in that a single system provides uniform policy application to any XR input. The user needs to only provide one policy. The parameters and rules of that single policy can be made to apply to any XR experience viewed by that user. For example, if the user does not like clowns, that can be specified in the user's policy model. Based on that expressed preference, the disclosed system and method will operate to omit or filter any clowns from any experience seen by the user. That is true whether the experience is a scary video game in which monsters are shown, but no clowns, or if the experience is a travelogue to a circus museum, in which case high-wire acts may be shown, but no clowns. The same is true for, for example, parental policies. Parents may specify limitations or preferences for what their children experience, and the policy will be applied across all XR experiences the children see.

Further, the disclosed system and method give content providers a chance to define policy and self-police to make sure recipients have understanding but can reach a wider audience with the same set of content. The system and method will ensure that only appropriate parts of an experience are shown to a particular user, based on controls set in the policy established by the content provider.

Still further, using a policy as a known constant, the policy can be sent to XR experience developers to quickly vet and approve concepts that they are adding to experiences. For example, the XR developers can determine if, in a planned design, is a particular motion too fast for some audience members based on their policy, or is this scene too scary for children based on a collection of children's policies. The design can be tested against one or a collection of policies to gauge the appropriateness of the XR experience or portions of the XR experience.

The system and method according to the disclosed embodiments makes use of a user policy associated with entertainment, including immersive experiences presented by XR and other virtual reality systems. The system and method can modify the XR mechanics based on personal preferences, demographics or other facts. In this case XR mechanics includes any feature of an XR immersive experience, including appearance, motion, rate of change, characters and their actions and reactions, etc. In one example, based on a policy model, the influence of gravity on an object can be made to appear slower because the user is older and cannot react as quickly.

Another substantial benefit of the disclosed system and method is the ability to use large-scale learning across multiple users, and to do A/B testing from XR experiences. The system can collect user responses to a variety of XR experiences and portions of experiences across a wide variety of experiences. A/B testing involves showing one version of an experience to one group of users and another version to another group of users, and evaluating the two versions based on responses of the two groups of users. By testing user responses and collecting information in this manner, the system can predict and prescribe the appropriate immersion impact for each persona and context. Example immersion impacts include danger to a user or the user's avatar, interaction speed such as the apparent speed of gravity, etc. Persons in the audience can be defined by their demographics or their personality or by their relative experience level with XR immersion. The context can be defined by a location, previous activity by a user with a particular type of immersion, etc.

Still another substantial benefit of the disclosed system and method is the proactive capability for the system to detect and notify content creators or XR participants of a systemic or repeatable issue within XR content. An example is blinking by the user followed by a sudden change in color over a short time span. Identifying such a problem does not require initial content or user annotation but can be detected by negative reaction across a wide population of users.

The disclosed system and method provide a unique component for an XR system that measures the impact of an object or an activity in an XR immersion, and its interaction with the user for direct modification of the XR experience. Such a system enhances resource need estimation instead of just bandwidth, visual complexity, etc. For example, developing an XR system requires substantial computing power and network bandwidth. As the XR experience changes and evolves based on user feedback, there may be different resource needs based on how the XR experience is changed. Developing the changes may take substantial processing power and network bandwidth, and estimating required resources may benefit from having knowledge of the resources required to develop the changes.

The disclosed system and method further provide a unique component for XR systems to propose experience modulation. For example, instead of deleting or hiding an object or activity for resource needs, a policy in the system could require the object animation path redirection to avoid the user, for example, to slow apparent speed through the physics that is applied to the an object or through animation, or through coloration, for example.

In some embodiments, the disclosed system and method allow for introduction of personal policies for the system that effect up-stream XR interactions as well as user perceptions. For example, outgoing interaction data, such as data defining what a user was looking at or what the user says in speech, is filtered or reduced in some way. In some examples, a personal profile is generated or updated based on utterances or other reactions of the user 226. For example, if the user 226 is shown a clown in the immersion and has such a strong negative reaction that the user screams or curses, the XR engine 220 may automatically note the reaction and update the profile of the user and the policy model of the user 226.

Some embodiments provide for institutional or multi-party joining or sharing of XR experiences. In such embodiments, the system and method in accordance with the disclosure can compute a group policy for a least restrictive environment. For example, in such an environment, the common-denominator for a group policy is set to a highest tolerable level for all participants. The immersion impact for any element of the immersive experience, such as an object or activity within the experience, may be compared with the group policy to identify a policy violation. For example, a speed at which objects move in the immersive experience or possible excitability of activity in the experience may be set to a level that all participants find acceptable, even if not preferred or ideal. In this manner, multiple users with different enablements or preferences can easily join and leave the experience.

In some embodiments, the XR engine 220 may correlate to biometric data of the user to further determine impact of an object or activity on a user. Thus, in the example of FIG. 2C, data may be collected from sensors 230 about biometric information of the user 226 such as heart rate, respiration rate, etc. This information may be collected and communicated to the XR engine 220 running on the XR server 234. It may be stored and processed by, for example, the classifier 244 or prediction engine 246. This collected biometric information may be utilized both as near-real-time system feedback and for tuning of a policy of the user. The biometric information may form a biometric response of the user and may be collected automatically and processed automatically to determine the state of the user 226 and thereby adjust the experience. For example, if the XR engine 220 determines from an elevated heartrate of the user that the user is feeling heightened anxiety, the XR engine 220 may identify this as a negative biometric response and can adjust the experience to reduce the anxiety level of the user. Similarly, if the XR engine 220 determines the user's heartrate or respiration rate falls, indicate relaxation by the user, the XR engine may identify this as a positive biometric response. Any type of change in the user may be considered a biometric response. In some applications, the user accesses a policy profile and adjusts the policy based on the experience. There can be a delay between the time the user determines the experience provokes anxiety and adjusts the user's policy profile. In contrast, if the adjustment to the policy profile is made automatically based on biometric information, the update to the policy profile can be made more quickly. Moreover, small adjustments can be made to the policy automatically by the XR engine 220 without active participation by the user 226.

In some embodiments, the XR engine 220 can provide a quick capability to establish a baseline of a user's preferences. For example, the XR engine 220 can implement a short probing round of experiences in a safe, interactive environment including the user. For example, the XR engine 220 can propose a test situation or place a test object in an immersion with the user, then query the user for a reaction to the test situation or test object. Based on a response from the user, the XR engine 220 can update one or more policies for the user and the situation. One example involves jump scares in video content. A jump scare is a technique intended to scare an audience by surprising them with an abrupt change in image or event, perhaps accompanied by a sudden sound. The XR engine 220 may provide one or more examples of jump scares to the user 226 in order to classify the user's response to jump scares, Subsequently, the XR engine 220 can use this baseline information to determine how to present such jump scares or other events in future experiences. This can provide more efficient use of processing resources of the XR engine 220 and permit determination of aspects of the user policy before the user experiences the test object or the test situation in XR for first time.

In some embodiments, the XR engine 220 can provide a recovery system for users that have been exposed to an overly negative impact. Some users may prefer a very intense immersive experience. In this example, the XR engine 220 determines that a user has been exposed to such an intense experience and could slowly reintroduce the user to an experience but at tolerable and safe levels. Alternatively, instead of or in addition to ramping down the intensity level after a particularly intense immersion, the XR engine 220 could ramp up the intensity level in stages to help acclimate the user to a more intense immersive experience.

Information about the user's state can be determined from available inputs such as sensors or camera input.

In some embodiments, the XR engine 220 can propose a qualification system for XR experience developers to quickly vet and approve concepts that they are adding to experiences. For example, based on past users' experiences, the XR engine 220 may provide an indication that a proposed motion in a game that is being designed is too fast, or that a proposed scene too scary for children. For example, in a game intended for children under age 13, the system may determine that a proposed add-on feature is only appropriate for viewers age 14 to 18, as vetted by the automatic system.

The system and method in accordance with the subject disclosure may be illustrated by a number of use cases. In a first use case, an XR system enables engagement with new technology by different populations. The XR system may use a policy model for respective users to determine a respective user's experience level and comfort level with different aspects of immersive experiences, and other factors relevant to immersion. Based on such factors, the XR system may then tailor an immersive experience to the user. For example, if the user indicates that the user is a novice user, or has anxiety or affinity toward particular features, the XR system can modify an experience as it is being presented to the user to accommodate and avoid the anxiety item and invoke the affinity item.

In another use case, the XR system can overlay aspects of XR and AR systems for safety. For example, in an immersion in which the user experience is around nature exploration in a canyon. As the experience plays out, the user may be exposed to a virtual boulder falling toward the user, creating impending danger. Previously, the boulder was not classified as dangerous, but based on the user's reaction, the system may automatically trigger a removal of the detected impact by the boulder from the experience. Further based on the user's response, the system may automatically update one or more policies to approve or disapprove falling object in a user experience. The system may further respond to additional information when updating policies such as demographics of the user, characteristics of the user such as whether the user is an adventure-seeking adult or a child new to immersive experiences.

In yet another use case, the XR system may be used to provide therapy and relaxation for the user. In one example, the system can detect anxiety or another condition on the part of the user. For example, this may be done automatically based on information from one or more sensors, or the user may manually provide information about the user's state. In response, based on the user's state, the XR system may automatically select content or scenery or objects or activities to alter the user's state, such as to reduce anxiety. The selection may be based on experience of the XR system with the particular user, experience with users in the demographic group of the user or on any other basis. In one example, if the XR system knows the user is a dog lover, the XR system may provide an immersive experience of a puppy approaching the user and licking the user's face, with the expectation that this will be calming and relaxing to the user.

In another example, the XR system may have a hierarchy of policies in which some policy provisions are ranked higher or more important and supersede provisions of policies that are ranked lower or less important. One example is a parental controls policy for children's immersive experiences. If the parental policy specifies that the children's immersions should exclude violence, that policy may be set to control all immersions for the affected children and limit the experiences available to the children. Independent of what the children may seek to view in an immersion, the parental control policy overrides the children's selection.

While for purposes of simplicity of explanation, the respective processes are shown and described as a series of blocks in FIG. 2D, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 3:
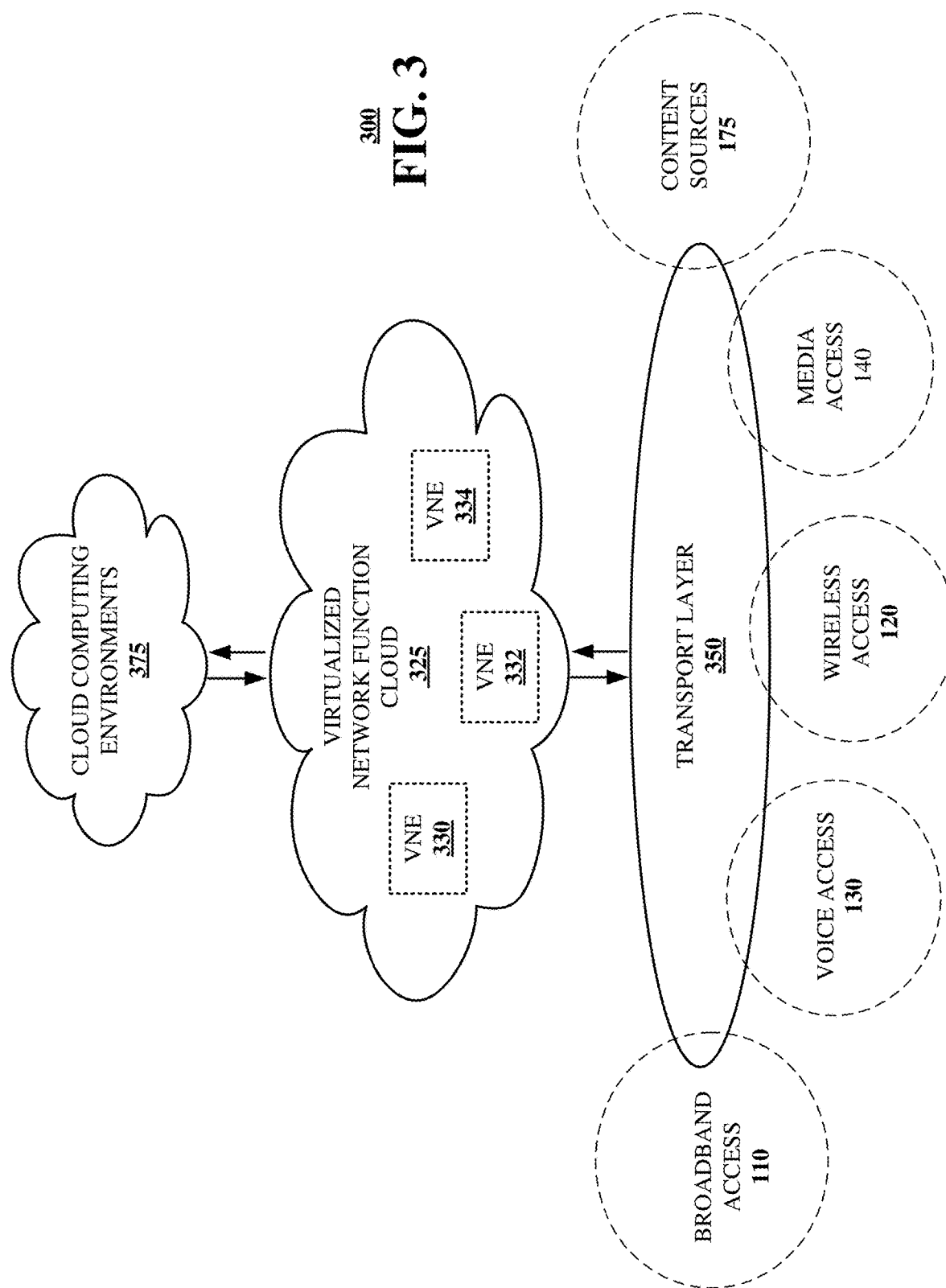
FIG. 3 is a block diagram illustrating an example, non-limiting embodiment of a virtualized communication network in accordance with various aspects described herein.

Referring now to FIG. 3, a block diagram is shown illustrating an example, non-limiting embodiment of a virtualized communication network 300 in accordance with various aspects described herein. In particular a virtualized communication network is presented that can be used to implement some or all of the subsystems and functions of communication network 100, the subsystems and functions of system 212, system 224, and method 240 presented in FIGS. 1, 2A, 2B, 2C, 2D and 3. For example, virtualized communication network 300 can facilitate in whole or in part modifying aspects of an extended reality (XR) immersive experience based on personal preferences, demographics or an existing policy model to improve the enjoyment of the experience by the user. Communications including data defining the immersive experience may be provided over virtualized communication network 300.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access network 110, wireless access network 120, voice access 130 network, media access network 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
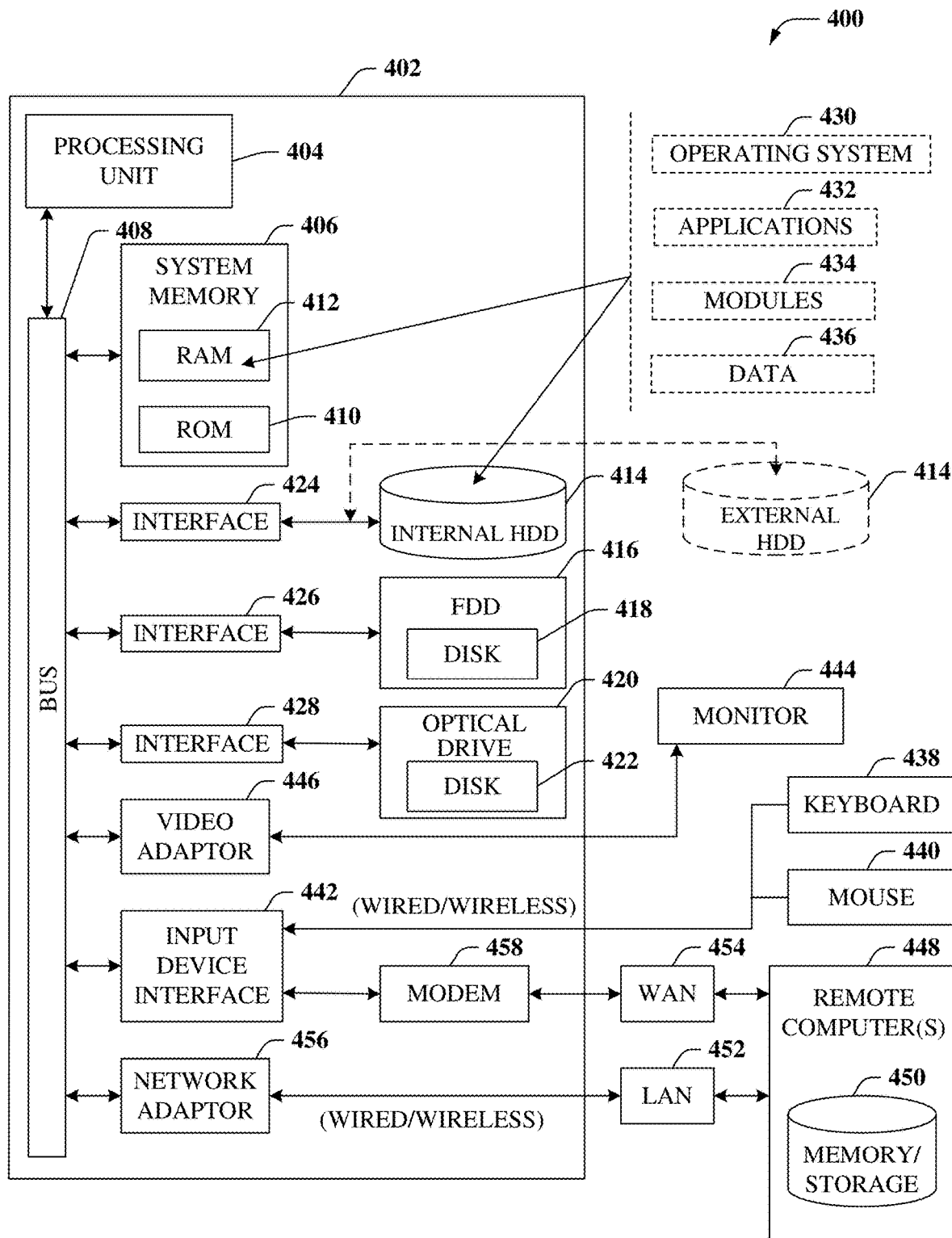
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part modifying aspects of an extended reality (XR) immersive experience based on personal preferences, demographics or an existing policy model to improve the enjoyment of the experience by the user. Data processing, including processing data defining the immersive experience may be provided by the computing environment 400.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
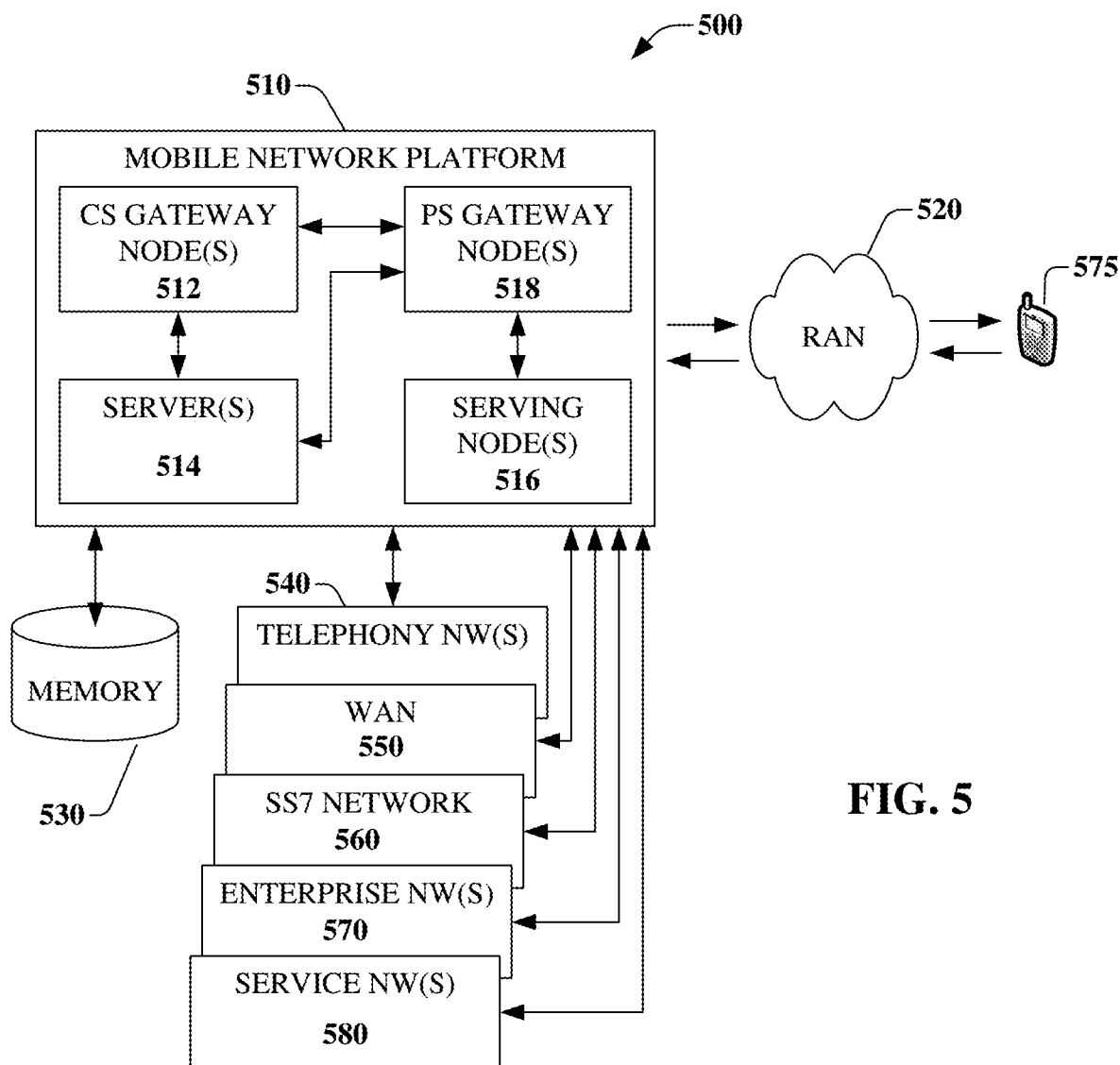
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, mobile network platform 510 can facilitate in whole or in part modifying aspects of an extended reality (XR) immersive experience based on personal preferences, demographics or an existing policy model to improve the enjoyment of the experience by the user. Communications including data defining the immersive experience may be provided in part over mobile network platform 510. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technologies utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
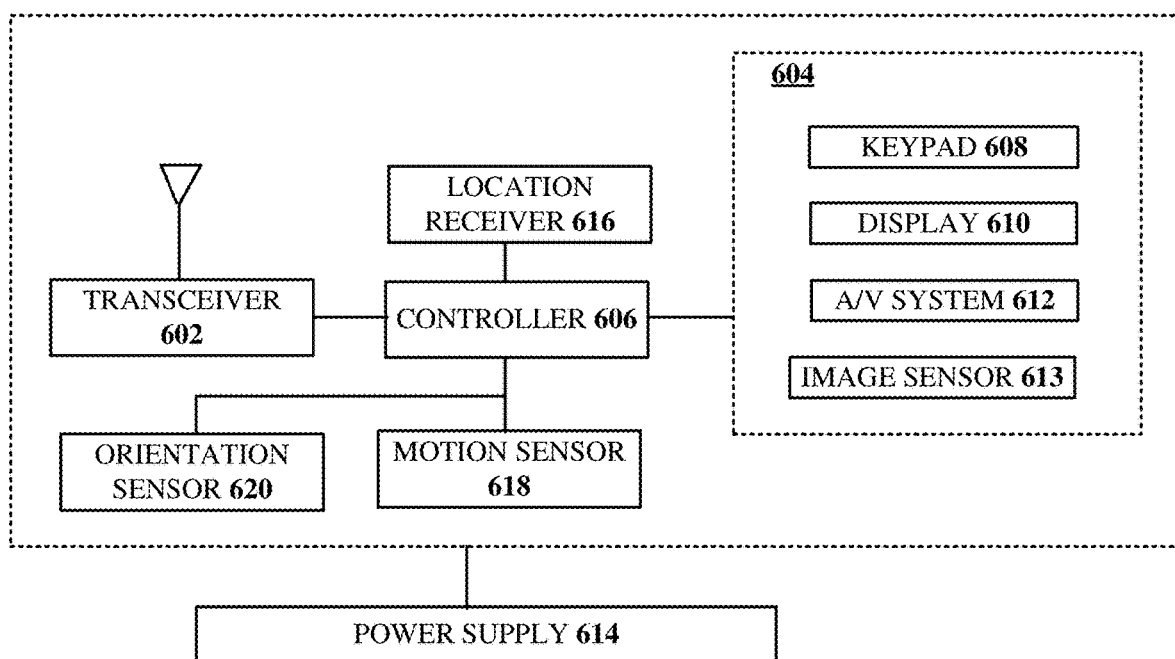
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part modifying aspects of an extended reality (XR) immersive experience based on personal preferences, demographics or an existing policy model to improve the enjoyment of the experience by the user. Data processing, including processing data defining the immersive experience may be provided by computing device 600.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)$ =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to pre-determined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs.

Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:
1. A device, comprising:
a processing system including a processor; and a memory that stores executable instructions that, when executed by the processing system, facilitate performance of operations, the operations comprising:
  initiating an immersive experience by a user of an extended reality (XR) system;
  assembling the immersive experience, forming an assembled immersive experience;
  communicating data defining the assembled immersive experience to an XR apparatus of the user;
  determining user preferences of the user;
  modifying one or more aspects of the immersive experience during the assembling the immersive experience according to one or more of the user preferences of the user;
  retrieving a user policy model of the user; and
  determining immersion impact preferences of the user based on the user policy model.

2. The device of claim 1, wherein the operations further comprise:
  identifying an XR impact in the immersive experience;
  identifying a response of the user to the XR impact in the immersive experience; and
  updating the user policy model based on the response of the user to the XR impact.

3. The device of claim 2, wherein the operations further comprise:
  identifying a negative XR impact of an object, an activity or a combination of these in the immersive experience, on the user;
  based on the negative XR impact, revising the user policy model to prevent future occurrence of the negative XR impact on the user;
  identifying a positive XR impact of an object, an activity or a combination of these in the immersive experience, on the user; and
  based on the positive XR impact, revising the user policy model to select similar occurrences of the positive XR impact in the future.

4. The device of claim 1, wherein the operations further comprise:
  retrieving an owner policy model of an owner of XR equipment;
  retrieving a content policy model of a provider of content, wherein the assembling the immersive experience comprises assembling the immersive experience based at least in part on the content;
  identifying a negative XR impact of an object, an activity or a combination of these in the immersive experience, on the user; and
  based on the negative XR impact, revising at least one of the owner policy model and the content policy model to prevent future occurrence of the negative XR impact on the user or another user.

5. The device of claim 1, wherein the operations further comprise:
  recognizing an XR impact in the assembled immersive experience, wherein the recognizing is based on identifying an impact that has been previously assessed;
  predicting a potential impact on the user;
  modifying the one or more aspects of the immersive experience, forming a modified immersive experience; and
  communicating data defining the modified immersive experience to the XR apparatus of the user to prevent the impact on the user.

6. The device of claim 1, wherein the determining user preferences of the user comprises:
  determining demographic information about the user; and
  determining the user preferences of the user based on the demographic information.

7. The device of claim 1, wherein the operations further comprise:
  receiving biometric information of the user during the communicating data defining the assembled immersive experience to the XR apparatus of the user;
  determining a biometric response of the user to a feature of the immersive experience, wherein the determining the biometric response of the user is based on the biometric information of the user; and
  responsive to the determining the biometric response of the user, modifying the feature of the immersive experience to prevent a future negative biometric response for the user or to promote a future positive biometric response for the user.

8. A non-transitory, machine-readable medium, comprising executable instructions that, when executed by a processing system including a processor, facilitate performance of operations, the operations comprising:
  assembling an extended reality (XR) immersive experience for a user;
  determining a user experience level for the user;
  adjusting an immersion detail level for the XR immersive experience according to the user experience level, wherein the adjusting the immersion detail comprises determining an immersion impact of one or more immersive components of the XR experience, and modifying at least one immersion aspect of the one or more immersive components of the XR experience before compositing the XR experience; and
  communicating data defining the XR immersive experience to XR equipment of the user.

9. The non-transitory, machine-readable medium of claim 8, wherein the operations further comprise:
  detecting a response of the user to an immersive component of the XR experience; and
  modifying the immersion detail level based on the response of the user.

10. The non-transitory, machine-readable medium of claim 8, wherein the determining the user experience level comprises:
  retrieving a policy model associated with the user; and
  determining one or more user preferences for immersive experiences based on the policy model.

11. The non-transitory, machine-readable medium of claim 8, wherein the determining the user experience level comprises:
  determining user demographics for the user; and
  determining one or more user preferences for immersive experiences based on the user demographics for the user.

12. The non-transitory, machine-readable medium of claim 8, wherein the operations further comprise:
  receiving content information from a content source;
  assembling the XR immersive experience based on the content information; and
  adjusting the immersion detail level for the XR immersive experience according to the content information.

13. The non-transitory, machine-readable medium of claim 12, wherein the operations further comprise:
  receiving a content policy model associated with the content information; and
  adjusting the immersion detail level for the XR immersive experience according to the content policy model.

14. The non-transitory, machine-readable medium of claim 8, wherein the operations further comprise
generating one or more test immersive experiences for the user;
communicating data defining the one or more test immersive experiences to the XR equipment of the user;
determining a response of the user to the one or more test immersive experiences; and
determining the user experience level for the user based on the response of the user.

15. A method, comprising:
generating, by a processing system including a processor, an immersive experience for a user;
providing, by the processing system, data defining the immersive experience to extended reality (XR) equipment of the user;
evaluating, by the processing system, immersion impact by elements of the immersive experience on the user;
determining, by the processing system, that a selected element of the immersive experience includes a policy violation of a policy for the user, wherein the determining is based on the immersion impact;
modifying, by the processing system, the selected element to avoid a policy violation, forming a modified element, wherein the modifying occurs prior to providing data defining the selected element in the immersive experience to the XR equipment of the user;
providing, by the processing system, without interruption, data defining the immersive experience to the XR equipment of the user during the modifying of the selected element to avoid the policy violation; and
providing, by the processing system, data defining the modified element to the XR equipment of the user.

16. The method of claim 15, wherein the determining that a selected element of the immersive experience includes a violation of a policy comprises:
identifying, by the processing system, one or more policies for the user and one or more policies for the immersive experience;
identifying, by the processing system, one or more objects of the immersive experience and one or more activities of the immersive experience; and
comparing an immersion impact for each respective object of the one or more objects and an immersion impact for each respective activity of the one or more activities with the one or more policies to identify a violation of a policy of the one or more policies.

17. The method of claim 15, wherein the modifying the selected element to avoid a policy violation comprises:
generating, by the processing system, a modified scenario to replace the selected element;
determining, by the processing system, if the modified scenario includes a policy violation of a policy for the user; and
responsive to the modified scenario including no policy violation, providing data defining the modified scenario to the XR equipment of the user.

18. The method of claim 15, wherein the user comprises a group of participants in the immersive experience and wherein the determining that the selected element of the immersive experience includes a policy violation of a policy for the user comprises:
determining, by the processing system, a group policy for all participants of the group of participants, wherein the group policy comprises a highest tolerable level for all participants of the group of participants; and
comparing, by the processing system, an immersion impact for the selected element with the group policy.

19. The method of claim 15, further comprising:
detecting a response of the user to an immersive component of the XR experience; and
modifying an immersion detail level based on the response of the user.

20. The method of claim 15, further comprising:
determining user demographics for the user; and
modifying an immersion detail level based on the user demographics of the user.

\* \* \* \* \*